United States Patent

Hattori et al.

[11] Patent Number: 6,151,147
[45] Date of Patent: Nov. 21, 2000

[54] OPTICAL COMMUNICATION APPARATUS

[75] Inventors: Atsunori Hattori; Yoshihiro Someno; Seiichi Okoshi, all of Miyagi-ken, Japan

[73] Assignee: Alps Electric Co., Ltd., Tokyo, Japan

[21] Appl. No.: 09/026,606

[22] Filed: Feb. 20, 1998

[30] Foreign Application Priority Data

Feb. 20, 1997 [JP] Japan ................................. 9-036460

[51] Int. Cl.$^7$ ................................................. H04B 10/002
[52] U.S. Cl. ................................................. 359/173; 359/157
[58] Field of Search ............................... 359/173, 127, 359/154, 157, 179

[56] References Cited

U.S. PATENT DOCUMENTS 4,761,777  8/1988  Edwards et al. ................. 359/173
5,751,455  5/1998  Shibutani et al. ................ 359/173

FOREIGN PATENT DOCUMENTS 5-14281  1/1993  Japan .

*Primary Examiner*—Kinfe-Michael Negash
*Attorney, Agent, or Firm*—Brinks Hofer Gilson & Lione

[57] ABSTRACT

An optical communication apparatus is provided that enhances the reliability of light source by extending the lifetime thereof without requiring a power supply line to generate the light signal. The light source produces light of a wide wavelength band when the system is operating. The system has a plurality of transmitting units and corresponding light receiving elements. When a switch in a particular transmitting unit is turned on, light of a specific wavelength wave-branched and reflected by a wave-separate filter is cut-off by the switch and the remaining light containing other wavelengths is transmitted to receiving units through a post-transmitting unit. In the receiving units, a light receiving element corresponding to the particular transmitting unit does not receive light of the specific wavelength when the corresponding switch is turned on. Other light receiving elements, however, receive light of a corresponding wavelength regardless of the state of the non-corresponding switch.

9 Claims, 3 Drawing Sheets

OPTICAL COMMUNICATION APPARATUS

BACKGROUND OF THE INVENTION

1. Field of the Invention

The present invention relates to an optical communication apparatus which is used as a system for transferring and detecting a light signal.

2. Description of the Related Art

Recently, an optical communication system which uses an optical fiber for planning a prevention of electromagnetic noise, an enlargement of has been put to a practical use, in place of the electrical communication system which transmits an electrical signal.

FIG. 6 is a configuration diagram showing a conventional optical communication apparatus which is used for such a system, and it is an optical communication system which, by turning a light emitting unit 1 electrically on/off, transmits this on/off information to a light receiving element 3 through an optical fiber 2. The light emitting unit 1 includes a light emitting element 1a composed of a LED and the like for converting an electrical signal to a light signal, a switch 1b for turning the light emitting element 1a on/off in response to information "1", "0", and a lens 1c for focusing an emission light of the light emitting element 1a to an end surface of the optical fiber 2, and an electrical switch is utilized as the switch 1b.

In the optical communication apparatus configured as above, when transmitting a light signal from one light emitting unit 1 to a plurality of light receiving elements 3 by time-dividing the light signal, the switch 1b should be switching in high speed. Also, when transmitting the light signal from a plurality of light emitting units 1 to the plurality of light receiving elements 3 with 1:1 ratio, the plurality of light emitting units 1 and the light receiving elements 3 which have selectivities for the wavelengths λ1, . . . ,λn, are placed on the optical fiber 2 corresponding with 1:1 ratio, by wavelength multiplexing.

As the above described optical communication system, a system is known for monitoring the operations of a plurality of circuit breakers in a vending machine or a plant and the like, and the operations of a plurality of door switches in an automobile.

However, in the conventional optical communication apparatus as described above, because the light signal is generated by turning the light emitting element 1a on/off with the switch 1b in the light emitting unit 1 on the transmitting side, thereby there is a problem such that the lifetime of the light emitting element 1a is shortened, and reliability of the system is low. Also, because it is required to provide a power supply to the light emitting element 1a in the light emitting unit 1 on the transmitting side, it is necessary to install a power supply line other than the optical fiber 2, and it can not sufficiently make use of the merit of optical communication system such as the lightening of the system and the simplification of work, thereby there is a problem such that it is not applicable to an explosion-proof system.

SUMMARY OF THE INVENTION

Accordingly it is an object of the present invention to provide an optical communication apparatus adapted for wavelength multiplexing by selectively cutting-off or transmitting predetermined different wavelengths, among the light on the transmitting side, using a common light source which emits a light of a wide wavelength-band. By configuring as such, since the common light source does not turn on/off according to a signal, and it may be just needed to continue a lighting state, the reliability could be enhanced by extending the lifetime of light source, and also it makes the power supply line for generating the light signal to be unnecessary by cutting-off or transmitting the light of the light source using a mechanical switch of a manual type on the transmitting side, thereby it can lighten the system, and simplify the work, as well.

In the optical communication apparatus of the present invention, it is configured such that it includes a light source for emitting light of a wide wavelength band, an optical fiber for transmitting the light from the light source, and a plurality of transmitting units and receiving units disposed with a one-to-one correlation along the optical fiber, wherein each of the plurality of transmitting units includes a transmitting unit for generating and transmitting signals to the optical fiber by selectively cutting-off or transmitting the light of predetermined different wavelengths, among the light of the wide wavelength band which are transmitted through the optical fiber, and wherein each of the plurality of receiving units includes a wave-branching filter for selectively wave-branching the light of predetermined different wavelengths, as well as for transmitting lights of other wavelengths, among the light of the wide wavelength band which are transmitted through the optical fiber and the plurality of transmitting units, and a light receiving element for receiving a light of a wavelength which is wave-branched by this wave-branching filter.

Further, in the optical communication apparatus, it is configured such that it includes a light source for emitting lights of a wide wavelength band, an optical fiber for transmitting the lights from the light source, and a plurality of transmitting units and one receiving unit disposed along the optical fiber, wherein each of the plurality of transmitting units includes a transmitting unit for generating and transmitting signals to the optical fiber by selectively cutting-off or transmitting the light of predetermined different wavelengths, among the light of the wide wavelength band which are transmitted through the optical fiber, and wherein the one receiving unit includes a spectral unit for wave-separating the light of the wide wavelength band which are transmitted through the optical fiber and the plurality of transmitting units, per the predetermined different wavelength, and a plurality of light receiving elements for selectively receiving the light of each wavelength, which are wave-branched by the spectral unit. In this case, the spectral unit could be configured by a prism or a diffraction grating.

An intense light source, such as a light bulb and the like, which emits the light of the wide wavelength band is used as the light source, and this light source is always lighting at a time when operating the system.

The transmitting unit is configured by a wave-branching filter for selectively wave-branching the light of predetermined different wavelengths, as well as for transmitting lights of other wavelengths, and a circuit breaker for cutting-off or transmitting the light which is wave-branched by this wave-branching filter, thereby it can combine the light cut-off or transmitted by the circuit breaker with the light of other wavelength transmitted through the wave-branching filter. In this case, as the circuit breaker, a manual mechanical switch or an electrical switch can be used. Preferably, the transmitting unit can be configured by an absorption filter having a characteristics of absorbing light of predetermined different wavelengths, as well as transmitting light of other wavelengths, and this absorption filter can be inserted or removed on the optical path.

Also, it is decided whether or not the optical fiber is disconnected such that among the lights of the wide wavelength band transmitted through the optical fiber, the lights of specific wavelengths are not used for communication signals, but for a detection of a disconnection of the optical fiber, and then by observing the specific wavelengths with the receiving units which correspond to the wavelengths, or with the light receiving elements which correspond to the wavelengths, in the light receiving array. Further, by not using the specific wavelengths for use in detecting the disconnection of the optical fiber such as above, it can be decided that the optical fiber is disconnected when all of the light receiving elements in the plurality of receiving units do not receive the light, or when all of the light receiving elements in the one receiving unit do not receive the light.

BRIEF DESCRIPTION OF THE DRAWINGS

These and other objects of the present invention will become more fully apparent with reference to the following description in conjunction with the drawing, of which.

DESCRIPTION OF THE PREFERRED EMBODIMENTS

Figure 1:
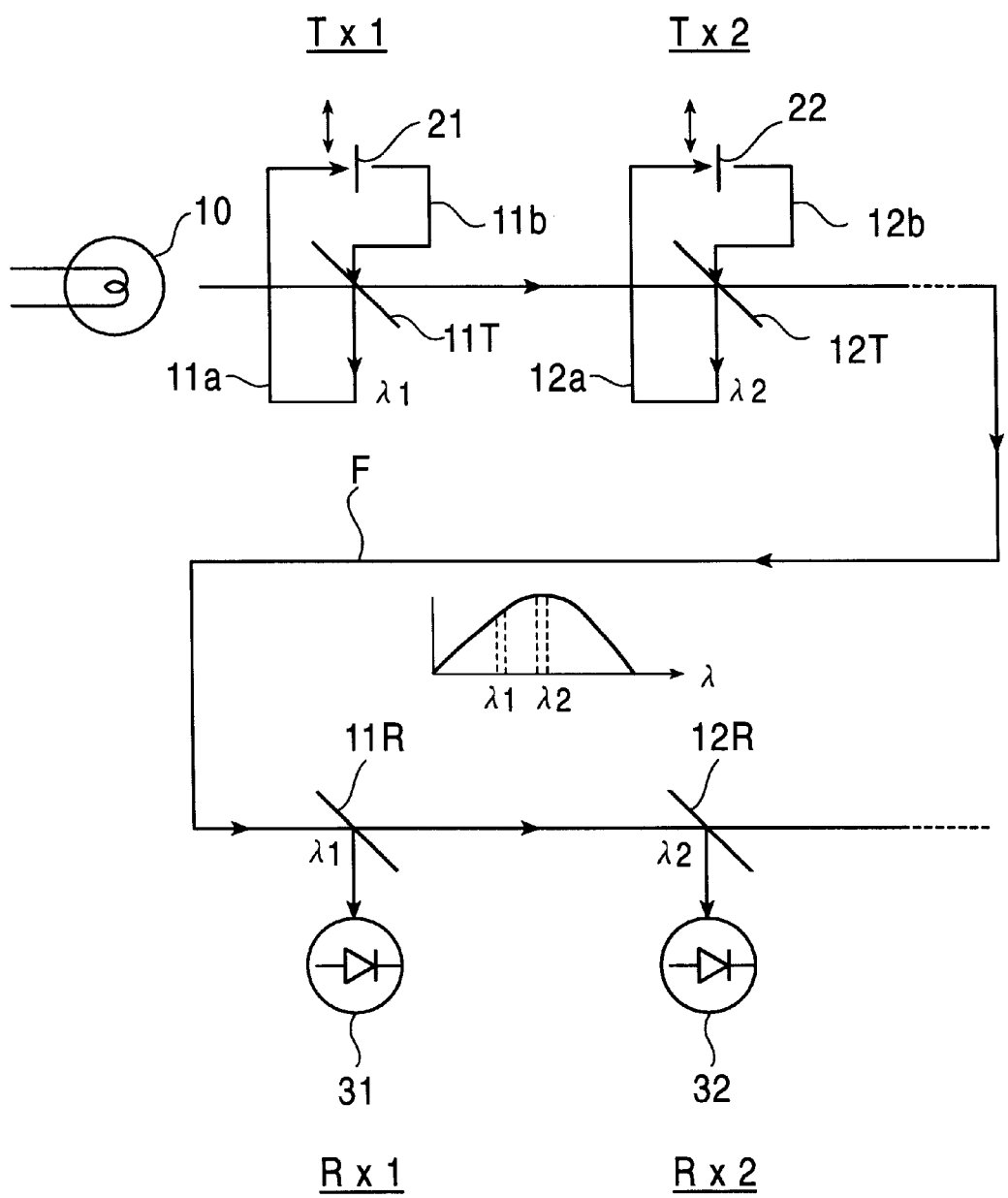
FIG. 1 is a diagram showing a configuration of the optical communication apparatus according to the first embodiment of the present invention.

Now describing an embodiment of the present invention with reference to the accompanying drawings, FIG. 1 is a diagram showing a configuration of an optical communication apparatus according to the first embodiment of the present invention. In FIG. 1, a reference numeral 10 indicates a light source which emits light of a wide wavelength band, and ideally this light source 10 would be a white light source, but an incandescent electric lamp would be suitable as well. An emission light of the light source 10 is incident by being focused on an end surface of an optical fiber through a lens (not shown), and is transmitted along the optical fiber F. A plurality of transmitting units Tx1, Tx2, ..., Txn which have selectivities for the wavelengths $\lambda 1, \lambda 2, ..., \lambda n$ respectively, and a plurality of receiving units Rx1, Rx2, ..., Rxn, are so disposed in an optical path of the optical fiber F that they are corresponding with a 1:1 ratio. In FIG. 1 only two pairs of the transmitting units Tx1, Tx2 and the receiving units Rx1, Rx2 are shown in order to simplify the description thereof, but in practice more than two pairs of transmitting units Txn and receiving units Rxn are being disposed along the optical path in correspondence with a 1:1 ratio.

The transmitting unit Tx1, Tx2 include the wave-branching filters (bandpass filters) 11T, 12T which selectively wave-branch and reflect the light of wavelengths $\lambda 1, \lambda 2$ among the light of the wide wavelength band on the optical fiber F as well as transmit other wavelengths, and the optical paths 11a, 12a which direct to the switches 21, 22 the light of wavelengths $\lambda 1, \lambda 2$ reflected in the wave-branching filters 11T, 12T, respectively, and the switches 21, 22 are turned on/off by cutting-off or transmitting the light of the wavelengths $\lambda 1, \lambda 2$ directed through the optical paths 11a, 12a.

Also, the light of the wavelengths $\lambda 1, \lambda 2$ which have transmitted through the switches 21, 22 are directed to the surfaces on the opposite sides of the wave-branching filters 11T, 12T through the optical paths 11b, 12b and are reflected, respectively, and then are combined with the light of other wavelengths which have been transmitted through the wave-branching filters 11T, 12T. Further, as the optical paths 11a, 12a and the optical paths 11b, 12b, for example, mirrors and/or optical fibers can be used.

The receiving units Rx1, Rx2 respectively corresponding to the transmitting units Tx1, Tx2 include the wave-branching filters 11R, 12R which selectively reflect the lights of the wavelengths $\lambda 1, \lambda 2$ among the light of the wide wavelength band on the optical fiber F in the same manner as well as transmit other wavelengths, and the light receiving elements 31, 32 which receive the lights of the wavelengths $\lambda 1, \lambda 2$ reflected in the wave-branching filters 11R, 12R.

In the optical communication apparatus configured as such, the light source 10 is always on at a time when operating the system. Then, for example, when the switch 21 is turned off in the transmitting unit Tx1, the light of the wavelength $\lambda 1$ which is wave-branched and reflected by the wave-branching filter 11T is not cut-off by the switch 21 and thus transmits through, and then is combined with light of other wavelengths which transmits through the wave-branching filter 11T by the wave-branching filter 11T. Accordingly, in this case, the light of the wide wavelength of the light source are transmitted as they are to the receiving units Rx1, Rx2 through the post transmitting unit Tx2. On the contrary, when the switch 21 is turned on, the light of the wavelength $\lambda 1$ which is wave-branched and reflected by the wave-branching filter 11T is cut-off by the switch 21, and thus, among the light of the wide wavelength band of the light source 10, the light other than the light of the wavelength $\lambda 1$ are transmitted to the receiving units Rx1, Rx2 through the post receiving unit Tx2.

Then, since in the receiving unit Rx1, the light of the wavelength $\lambda 1$ reflected by the wave-branching filter 11T is received by the light receiving element 31, the light receiving element 31 receives the light of the wavelength $\lambda 1$ when the corresponding switch 21 of the transmitting unit Tx1 is turned off, and on the other hand, the light receiving element 31 will not receive the light of the wavelength $\lambda 1$ when the switch 21 is turned on. Also, since, in the next receiving unit Rx2, the light of the wavelength $\lambda 2$ reflected by the wave-branching filter 12R is received by the light receiving element 32, the light receiving element 32 receives the light of the wavelength $\lambda 2$ despite of on/off of the switch 21 in the non-corresponding receiving unit Tx1, and further, it receives the light of the wavelength $\lambda 2$ when the the switch 22 of the corresponding receiving unit Tx2 is turned off, but on the other hand, it does not receive the light of the wavelength $\lambda 2$ when the switch 22 is turned on.

Figure 2:
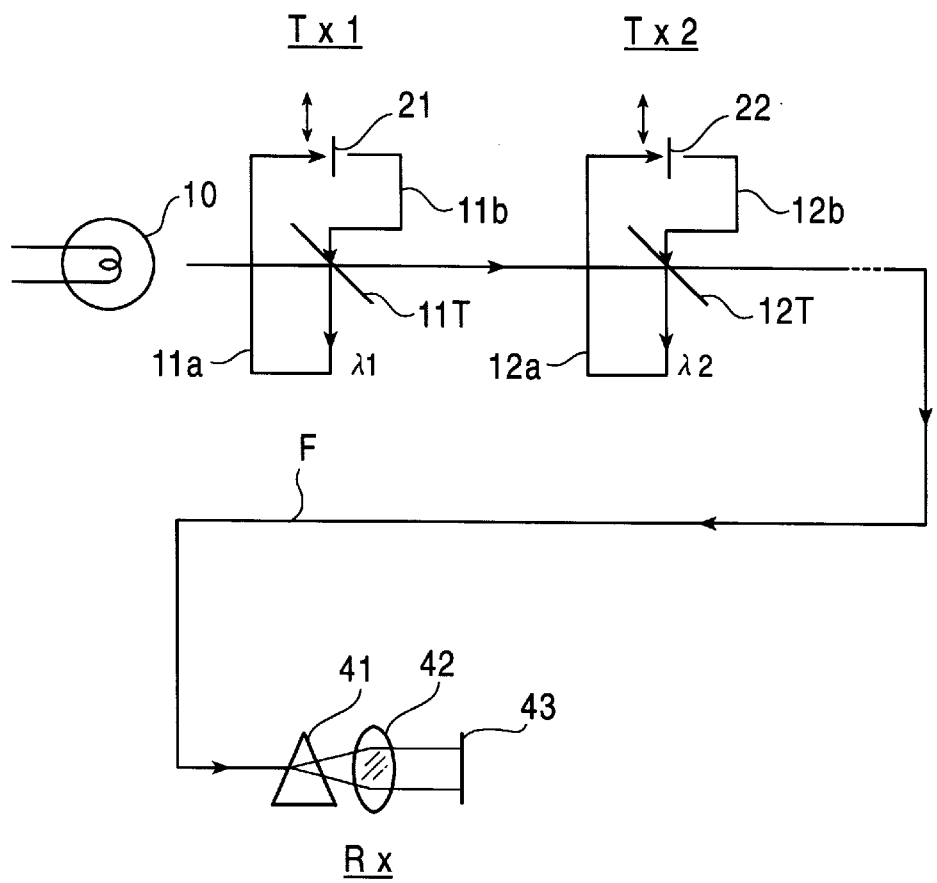
FIG. 2 is a diagram showing a configuration of the optical communication apparatus according to the second embodiment of the present invention.
Figure 3:
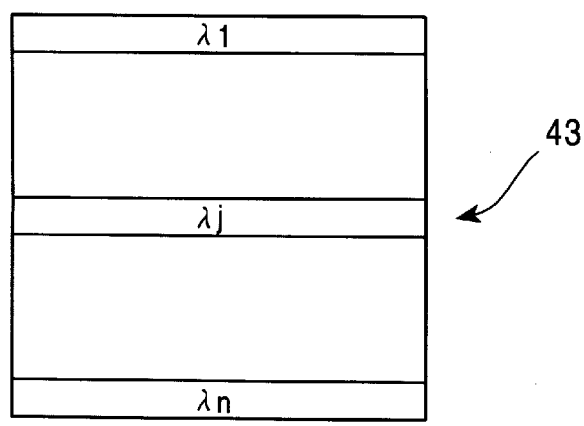
FIG. 3 is a diagram showing a configuration of the light receiving element which is provided in the optical communication apparatus of FIG. 2.
Figure 4:
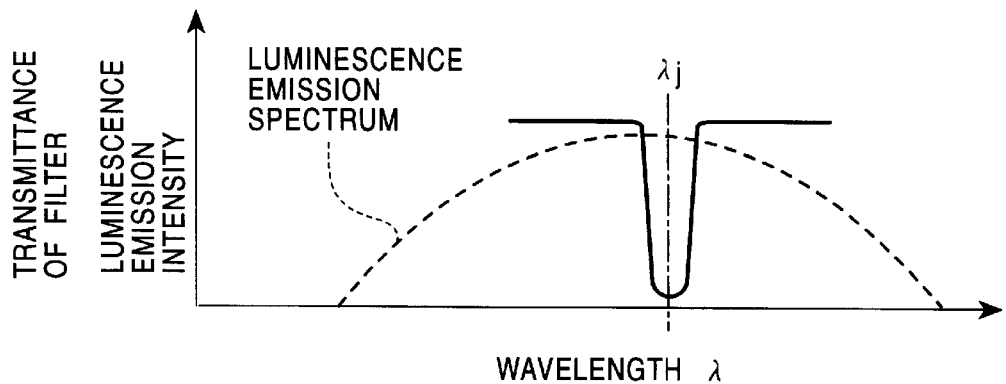
FIG. 4 is a diagram illustrating a wavelength multiplexing of the optical communication apparatus of FIG. 2.

FIG. 2 is a diagram showing a configuration of the optical communication apparatus according to the second embodiment of the present invention, FIG. 3 is a diagram showing the light receiving element array, and FIG. 4 is a diagram illustrating the wavelength multiplexing.

In this second embodiment, although a plurality of transmitting units Tx1, Tx2, ..., Txj, ..., Txn (only Tx1, Tx2 are shown) with the same configurations as the first embodiment are being disposed on the optical path of the optical fiber F, it differs from the first embodiment in a point that only one receiving unit Rx is disposed. This receiving unit Rx includes a prism 41 which light-branches the light of the wide wavelength band on the optical fiber F into each of the wavelength on the receiving units Tx1, Tx2, ..., Txj, ..., Txn sides, a condenser lens 42, and a light receiving unit array 43 into which the plurality of light receiving element (shown λ1,λ2, ..., λj, ..., λn) are disposed in the spectral direction as shown in FIG. 3. Further, it may be light-branched by using, for example, a diffraction grating and the like in place of the prism 41.

Also in the optical communication apparatus configured as such, the light source 10 is always on at a time when operating the system, and for example when the switch 21 is turned off in the transmitting unit Tx1, the light of the wavelength λ1 which is wave-branched and reflected by the wave-branching filter 11T is not cut-off by the switch 21 and thus transmits, and as shown by the dotted line in FIG. 4, all light receiving elements of the light receiving element array 43 in the receiving unit Rx receive the light. And when the light is cut-off by the switch 2j of the transmitting unit Txj in the j-th order, as shown by the solid line in FIG. 4, the light receiving element of the j-th order in the light receiving element array 43 does not receive the light and other light receiving elements receive the light.

As such, according to the first and second embodiments as described above, since the light souce 10 is not turned on/off in response to a signal, but is always on when operating the system, it makes possible to extend the lifetime of the light source 10, thereby enhancing the reliabilty thereof. Further, since only the predetermined wavelengths among the light of the wide wavelength band of the light source 10 are cut-off/transmitted by the switches 21, 22, . . . on the transmitting units Tx1, Tx2, . . . , Txn sides, lightening the system, and simplifying the work can be made without requiring the power supply line for generating a light signal, by inserting or removing with respect to the optical paths using manual mechanical switches as the switches 21, 22, . . . . Furthermore, in the system which is only needed to be turned on/off by the power supply, the light can be cut-off/transmitted using, for example, an electrical switch such as a liquid crystal shutter as the switches 21, 22, . . . .

Figure 5:
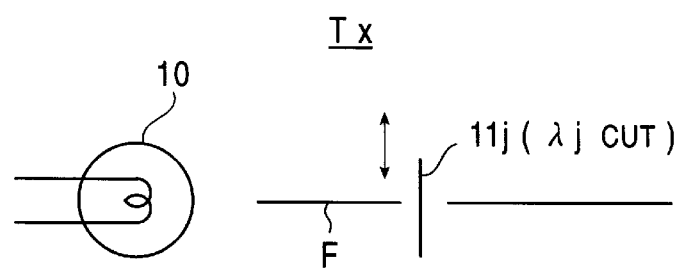
FIG. 5 is a diagram showing a configuration of a main part of the optical communication apparatus according to the third embodiment of the present invention.
Figure 6:
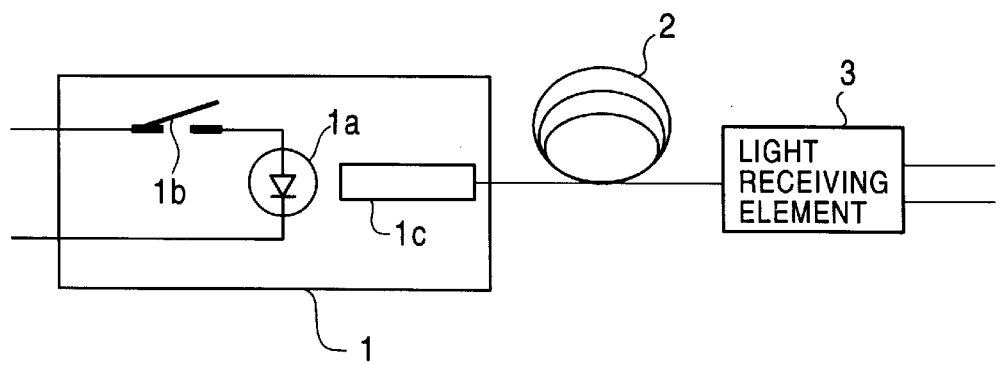
FIG. 6 is a diagram showing a configuration of the conventional optical communication apparatus.

FIG. 5 is a diagram showing a main part of an optical communication apparatus according to the third embodiment of the present invention, and in this third embodiment, in place of the wave-branching filters 11T, 12T, . . . and the switches 21, 22, . . . , it is adapted such that the transmitting unit Tx absorbs a predetermined wavelength λj as well as wavelength-multiplexes by an absorption filter and switch 11j which transmits other wavelengths. Since this absorption filter and switch 11j can be used as a manual mechanical switch, and can cut-off or transmit the predetermined wavelength λj by inserting or removing with respect to the optical path according to an operation state thereof, thereby it can be configured less expensive comparing to the first and second embodiments.

Also, according to the first to third embodiments, because the light source 10 is always on at a time when operating the system, without using the predetermined wavelength (e.g., λk) on the receiving units Tx1, Tx2, . . . , Txn sides, it can be detected whether or not the optical fiber F is disconnected, by monitoring the receiving unit Txk for use in detecting the disconnection of the optical fiber F (the first embodiment) or the light receiving element in the k-th order of the light receiving element array 43 (the second embodiment). Or instead of them, it may be decided that the optical fiber F is disconnected, when all of the light receiving elements 31, 32, . . . of the receiving units Rx1, Rx2, . . . , Rxn do not receive the light in the first embodiment, or all of the light receiving elements of the light receiving element array 43 of the receiving unit Rx do not receive the light in the second embodiment.

As described above, according to the present invention, it is arranged to wavelength-multiplex predetermined different wavelengths by selectively cutting-off or transmitting them among the light on the transmitting side, using the common light source which emits the light of the wide wavelength band, so that the common light source would not be turned on/off in response to the signal, and it is only necessary to continue the lighting state, thereby extending the lifetime of the light source as well as enhancing the reliability thereof. Further, lightening the system, simplifying the work can be made without requiring the power supply line for generating the light signal, by cutting-off or transmitting the light of the light source using a manual mechanical switch on the transmitting side.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical communication apparatus, comprising:

a light source to emit light of a wide wavelength band;

an optical fiber to transmit said light from said light source; and a plurality of transmitting units and receiving units disposed with a one-to-one correspondence along said optical fiber, wherein each of said plurality of transmitting units includes a transmitting mechanism, the transmitting mechanism having a first wave-branching filter to selectively wave-branch light of a predetermined wavelength, as well as to transmit light of other wavelengths of the wide wavelength band transmitted through said optical fiber, and a circuit breaker to selectively cut-off and transmit light wave-branched by the first wave-branching filter, said first wave-branching filter combines light transmitted by said circuit breaker with light of other wavelengths transmitted through said first wave-branching filter and transmits said combined light, each of said transmitting mechanisms wave-branching light of a different wavelength of the wide wavelength band, wherein each of said plurality of receiving units includes a second wave-branching filter to selectively wave-branch light of a wavelength corresponding to the light of predetermined wavelengths of the first wave-branching filters, and a light receiving element to receive the light of the wavelength wave-branched by the second wave-branching filter, each of the receiving units wave-branching light of different corresponding wavelengths.

2. An optical communication apparatus according to claim 1, wherein said circuit breaker is a manual mechanical switch.

3. An optical communication apparatus according to claim 1, wherein said circuit breaker is an electrical switch.

4. An optical communication apparatus according to claim 1, wherein a monitoring mechanism to monitor a light-receiving state of said plurality of receiving elements determines that said optical fiber is disconnected, when all of said plurality of light receiving elements do not receive light.

5. An optical communication apparatus, comprising:

a light source to emit light of a wide wavelength band;

an optical fiber to transmit said light from said light source; and a plurality of transmitting units and one receiving unit disposed along said optical fiber, wherein each of said plurality of transmitting units includes a transmitting mechanism, the transmitting mechanism having a wave-branching filter to selectively wave-branch light of a predetermined wavelength, as well as to transmit light of other wavelengths of the wide wavelength band transmitted through said optical fiber, and a circuit breaker to selectively cut-off and transmit light wave-branched by the wave-branching filter, said wave-branching filter combines light transmitted by said circuit breaker with light of other wavelengths transmitted through said wave-branching filter and transmits said combined light, each of said transmitting mechanisms wave-branching light of a different wavelength of the wide wavelength band, wherein said one receiving unit includes a spectral mechanism to wave-branch light of the wide wavelength band transmitted through said optical fiber and said plurality of transmitting units, per said predetermined different wavelength, and a receiving element array comprising a plurality of light receiving elements to selectively receive light of each wavelength wave-branched by said spectral mechanism.

6. An optical communication apparatus according to claim 5, wherein said circuit breaker is a manual mechanical switch.

7. An optical communication apparatus according to claim 5, wherein said circuit breaker is an electrical switch.

8. An optical communication apparatus according to claim 5, wherein light of a specific wavelength among light of the wide wavelength band transmitted through said optical fiber is not used for communication signals, but for a detection of a disconnection of said optical fiber.

9. An optical communication apparatus according to claim 5, wherein a monitoring mechanism to monitor a light-receiving state of said plurality of receiving elements determines that said optical fiber is disconnected, when all of the plurality of light receiving elements of said receiving element array do not receive light.

* * * * *